Patented Oct. 1, 1929

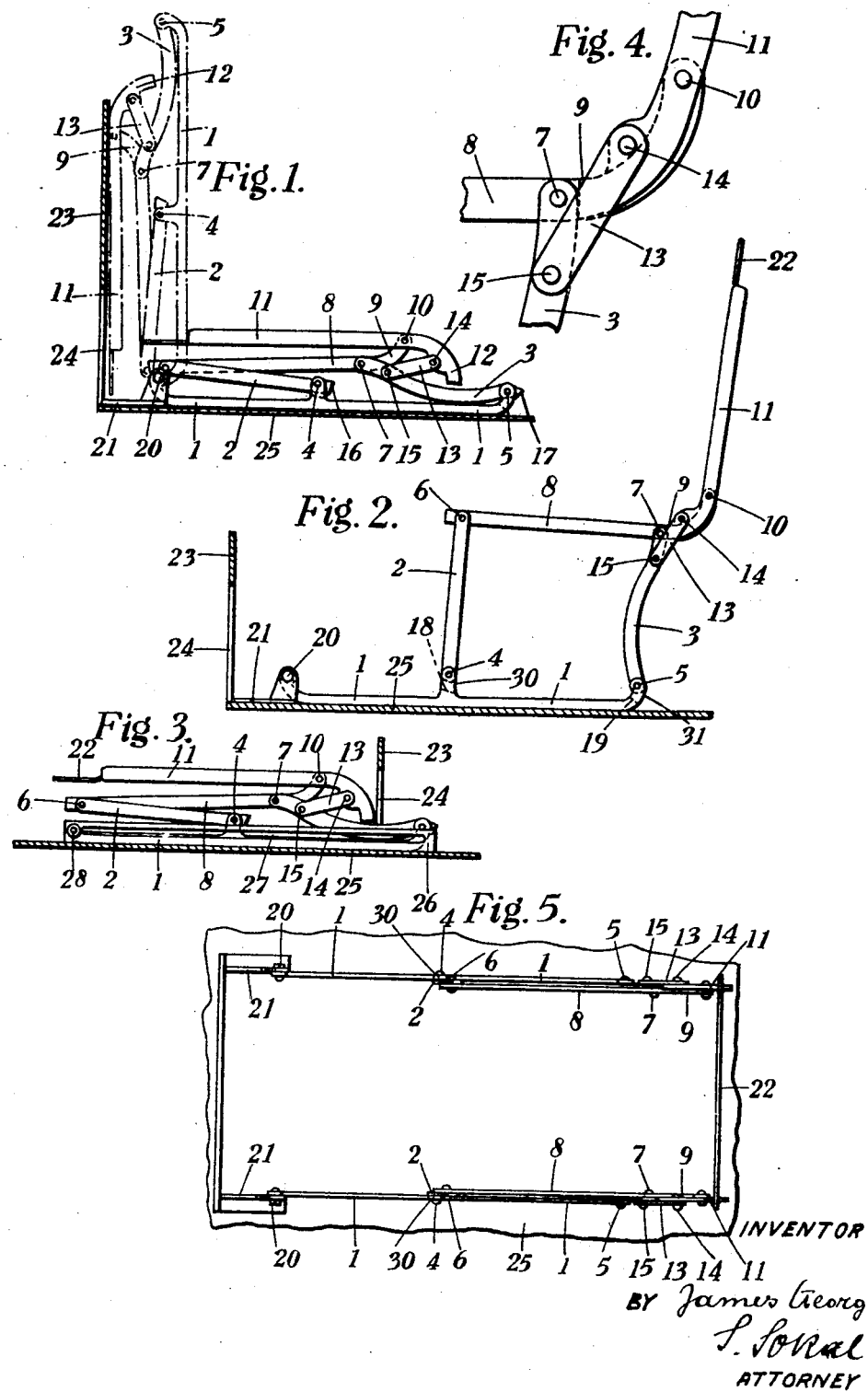

1,729,669

UNITED STATES PATENT OFFICE

JAMES GEORGE, OF BIGGLESWADE, ENGLAND

FOLDING SEAT FOR MOTOR CARS

Application filed January 17, 1929, Serial No. 333,181, and in Great Britain December 21, 1928.

The present invention relates to folding seats for motor cars of the type wherein the front and the rear legs supporting the seat, are pivoted at their lower ends to a pivoted or to a slidable base and are, upon collapsing the seat folded down in the same direction. The whole seat may then be tilted upwardly with the base so as to rest against a vertical partition or wall, or in the case of a sliding base, it may be slid into a suitable recess parallel to the floor.

One object of the invention is to construct a seat of this type in such a manner as to avoid accidental collapsing of the seat when in use, for instance under the action of a force set up by a sudden braking or stopping of the car. Another object of the invention is to construct a seat secure against accidental collapsing, which has a considerable depth and is therefore comfortable, whilst occupying a comparatively small space in the collapsed condition. Yet another object of the invention consists in providing a seat of the above type, which has a backrest of considerable height acting as a lock for holding the seat in the operative position.

With these objects in view the invention consists in an improved construction of the seat having the features hereinafter described and particularly set out in the appended claims.

Fig. 1 is an elevation showing the seat folded down and also tipped up.

Fig. 2 is an elevation showing the seat in its position of use.

Fig. 3 shows a modification in which the seat after being folded down is slid forwardly into a suitable recess in the car.

Fig. 4 is a detail view of the locking means, and

Fig. 5 is a plan corresponding to Fig. 2.

In Figs. 1 to 4 only one side of the seat is shown for the sake of clearness, the other identical side, the seat proper and the backrest being omitted.

The legs 2 and 3 are pivoted at 4 and 5 respectively to vertical extensions 30, 31 of the base member 1 which is pivoted at its forward end at 20 to bracket 21 fixed to the floor of the car, say near the partition 23 dividing the inner part of the car from the part reserved for the driver. The legs 2 and 3 may be folded down towards the pivot 20, the movement in the opposite direction being limited by extensions 16 and 17 of the legs co-operating with suitable stops 18 and 19 formed on the base member 1. The legs are connected at the upper ends by a member 8 pivoted to the legs at 6 and 7. The seat proper or pad is fixed between the member 8 and the corresponding member 8 (not shown) of the other side of the seat. The member 8 is provided with a rearward extension 9 to which is pivoted at 10, the member 11 supporting the backrest. The member 11 is flattened at the top end as shown at 22, the flattened portions 22 of the two members 11 carrying a transverse member, or being connected as shown in Fig. 5. The backrest proper is fixed between or to the members 11 and the transverse member as usual. The member 11 has a downward extension 12 which in the operative position of the seat rests against the upper portion of the leg 3. The point 14 of the downward extension of the member 11 is connected by a link 13 with a point 15 arranged below the pivot point 7, in such a manner that the point 14 travels past the straight line between centres 10 and 15 when the seat is brought into position of use shown in Figs. 2 and 4. This locks the seat and avoids accidental collapsing of same when in use. It will be seen that any accidental collapsing by opening the parts 3 and 8, that is, by increasing the angle between them, is impossible, as upon opening the parts 3 and 8 the link 13 will tend to turn the part 12 clockwise about pivot 10 and lock the seat.

In order to fold down the seat into the position shown in full lines in Fig. 1, it is quite sufficient to grasp the upper part 22 of the member 11 and turn same to the left, the movement of the member 11 being transmitted through the link 13 to the legs. After the seat has been folded down into the full lines position shown in Fig. 1, it may be tipped up into the position shown by dotted lines in Fig. 1 so as to rest against the partition 23. It will be seen that owing to the particular arrangement of the member 11, a seat of considerable depth is obtained, moreover, the height of the backrest is greater than in seats in which the backrest is rigidly connected to or forms an extension of, the rear leg 3.

24 indicates the usual opening in the partition 23 to afford space for the feet of the occupant of the seat.

Fig. 3 shows a slightly modified arrangement in which the whole seat after being folded down may be slid forward into a recess, for instance, the hollow space under the driver's seat. For this purpose, lateral guides 26 (only one shown in the drawing) are provided in which lateral projections 28 at the fore ends of the two members 1 are guided in slots 27.

The drawing shows the seat folded down and slid forward. The opening 24 may when the seat is not in use, be covered by a flap made of fabric or the like.

I claim:

1. A folding seat for motor cars comprising in combination: front legs pivoted at their lower ends; rear legs pivoted at their lower ends; a connecting member pivotally connected to the top end of a front leg and the top end of the corresponding rear leg, provided with a rearward and upward extension; a member for supporting a backrest pivoted to the said extension of the connecting member and provided with a downward extension which in the operative position of the seat acts as a stop holding the backrest supporting member in its rearward position; and a link connecting the rear leg with the downward extension of the backrest supporting member, the said link and extension being so arranged that when the seat is put up for use the point of connection of the link and the extension is located in front of the straight line connecting the pivot of the backrest supporting member and the pivot of the link, substantially as described.

2. A folding seat for motor cars, comprising in combination: front and rear legs adapted to turn about their lower ends; means for limiting the turning movement of the legs in the rearward direction; a member pivotally connected to the tops of corresponding front and rear legs and provided with an upward and rearward extension; a backrest supporting member pivoted to said extension and provided with an extension resting against the top of a rear leg at a point below the top pivot of the rear leg; and a link connecting the rear leg and the last mentioned extension, the point of connection lying in the operative position of the seat in front of the straight line connecting the pivot of the backrest supporting member and the lower pivot of the link, substantially as described.

3. In a folding seat for motor cars of the type described, the combination of: a rear leg adapted to turn about its lower end; a backrest supporting member adapted to turn about its lower end and resting (when the seat is in use) with a downward extension against the top of the rear leg; and a link connecting the rear leg and the seat extension, the point of connection of the said link and said extension lying in front of the straight line connecting the pivot of the backrest supporting member and the lower pivot of the link, substantially as described.

JAMES GEORGE.